US011869031B2

(12) United States Patent
Glynn-Udrow et al.

(10) Patent No.: US 11,869,031 B2
(45) Date of Patent: Jan. 9, 2024

(54) SYSTEM AND METHOD FOR PROVIDING AN INDICATOR TO OFFSET A PURCHASE PRICE

(71) Applicant: The Toronto-Dominion Bank, Toronto (CA)

(72) Inventors: Nolan Glynn-Udrow, Mississauga (CA); Sahana Dorai, Hamilton (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/887,932

(22) Filed: Aug. 15, 2022

(65) Prior Publication Data
US 2022/0391942 A1    Dec. 8, 2022

Related U.S. Application Data

(63) Continuation of application No. 17/061,997, filed on Oct. 2, 2020, now Pat. No. 11,449,891.

(51) Int. Cl.
*G06Q 30/0226* (2023.01)
*G06Q 30/0207* (2023.01)
(Continued)

(52) U.S. Cl.
CPC ....... *G06Q 30/0233* (2013.01); *G06F 16/958* (2019.01); *G06F 16/9566* (2019.01);
(Continued)

(58) Field of Classification Search
CPC ........... G06Q 30/0233; G06Q 30/0185; G06Q 30/0215; G06Q 30/0222; G06Q 30/0633;
(Continued)

(56) References Cited

U.S. PATENT DOCUMENTS

| 7,686,218 B2 | 3/2010 | Hessburg et al. |
| 8,533,036 B2 | 9/2013 | Shukla et al. |

(Continued)

FOREIGN PATENT DOCUMENTS

WO    WO2002008970    1/2002

OTHER PUBLICATIONS

"Get to know the Honey browser extension" https://web.archive.org/web/20200501211801/https://help.joinhoney.com/article/39-what-is-the-honey-extension-and-how-do-i-get-it (Year: 2020).*

(Continued)

*Primary Examiner* — Alexandru Cirnu
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to monitor an active webpage associated with a web browser executing on a computing device; determine that the active webpage associated with the web browser meets predetermined criteria, the predetermined criteria including determining that the active webpage is found in a whitelist; and in response to determining that the active webpage meets the predetermined criteria, send, via the communications module and to the computing device, a signal causing the computing device to display an indicator indicating an option to apply loyalty points to offset a purchase price.

17 Claims, 19 Drawing Sheets

(51) Int. Cl.
*G06F 16/955* (2019.01)
*G06Q 30/0601* (2023.01)
*G06F 16/958* (2019.01)
*G06Q 30/018* (2023.01)

(52) U.S. Cl.
CPC ..... *G06Q 30/0185* (2013.01); *G06Q 30/0215* (2013.01); *G06Q 30/0222* (2013.01); *G06Q 30/0633* (2013.01); *G06Q 30/0641* (2013.01)

(58) Field of Classification Search
CPC ............ G06Q 30/0641; G06F 16/9566; G06F 16/958
See application file for complete search history.

(56) References Cited

U.S. PATENT DOCUMENTS

| | | | |
|---|---|---|---|
| 8,595,133 | B2 | 11/2013 | Chuang et al. |
| 8,655,779 | B2 | 2/2014 | Postrel |
| 9,972,047 | B1 | 5/2018 | Elliott et al. |
| 10,121,129 | B2 | 11/2018 | Kalgi |
| 10,248,964 | B1 | 4/2019 | Neeman et al. |
| 10,937,046 | B1* | 3/2021 | Henderson ......... G06Q 30/0641 |
| 2002/0046109 | A1 | 4/2002 | Leonard et al. |
| 2012/0023011 | A1* | 1/2012 | Hurwitz ................. G06Q 20/10 705/39 |
| 2012/0041810 | A1 | 2/2012 | Hofer |
| 2013/0046656 | A1 | 2/2013 | Koskelainen et al. |
| 2014/0058821 | A1 | 2/2014 | Subbarao et al. |
| 2015/0149271 | A1* | 5/2015 | Battle ................. G06Q 30/0233 705/14.33 |
| 2017/0293930 | A1* | 10/2017 | Clark .................. G06Q 30/0234 |
| 2018/0082320 | A1* | 3/2018 | Hudson .............. G06Q 30/0239 |
| 2019/0073666 | A1* | 3/2019 | Ortiz ..................... H04L 9/0637 |
| 2021/0295368 | A1* | 9/2021 | Taffer ................. G06Q 30/0635 |

OTHER PUBLICATIONS

Honey: "Get to know the Honey browser extension", retrieved from https://help.joinhoney.com/article/39-what-is-the-honey-extension-and-how-do-i-get-it, on.

Chrome Web Store: "Redeem on Amazon.com with LATAM Pass Miles", https://chrome.google.com/webstore/unsupported/okembgocccnjoiaafmdedmhodcoalbgg?hl=en; published on Jul. 14, 2020.

Chrome Web Store: "Shop on Amazon.com with LifeMiles", https://chrome.google.com/webstore/unsupported/nhpbecook-kacdjfpoiepncmcdjkemobm?hl=en, published on Jul. 9, 2020.

Wingsfinancial: "Member Rewards Program Terms & Conditions", https://www.wingsfinancial.com/wingsfinancial/media/forms-and-disclosures/forms/wings-member-rewards-terms-conditions.pdf, published on Aug. 1, 2020.

CIPO: Office Action related to Canadian Application No. 3,095,013 dated Jul. 25, 2203.

* cited by examiner

SYSTEM AND METHOD FOR PROVIDING AN INDICATOR TO OFFSET A PURCHASE PRICE

CROSS-REFERENCE TO RELATED APPLICATIONS

This application is a continuation of U.S. patent application Ser. No. 17/061,997 filed on Oct. 2, 2020, the entire contents of which are incorporated herein by reference.

TECHNICAL FIELD

The present application relates to systems and methods for providing an indicator to offset a purchase price.

BACKGROUND

On-line shopping experiences often provide the user an option to enter a discount code to reduce a purchase price. The option to enter the discount code is typically provided during a checkout experience and as such the user is required to load their virtual shopping cart before determining the reduced purchase price.

Other mechanisms to reduce or offset a purchase price may not be known to a user. For example, during an on-line shopping experience, a user may not be aware that loyalty points may be used to reduce or offset a purchase price.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
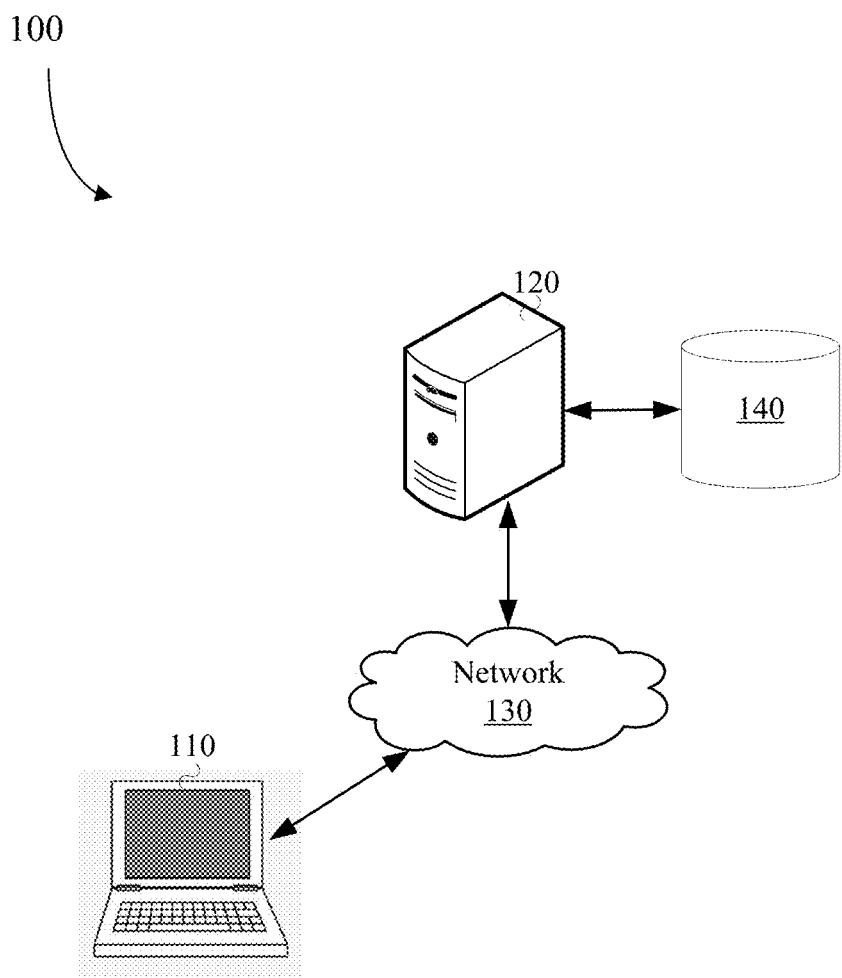
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to monitor an active webpage associated with a web browser executing on a computing device; determine that the active webpage associated with the web browser meets predetermined criteria, the predetermined criteria including determining that the active webpage is found in a whitelist; and in response to determining that the active webpage meets the predetermined criteria, send, via the communications module and to the computing device, a signal causing the computing device to display an indicator indicating an option to apply loyalty points to offset a purchase price.

In one or more embodiments, the whitelist includes at least one of a list of merchants, a list of items or a list of uniform resource locators (URLs).

In one or more embodiments, the indicator includes at least one selectable option to apply the loyalty points to offset the purchase price.

In one or more embodiments, the processor-executable instructions, when executed by the processor, further configure the processor to determine a conversion rate of loyalty points based on at least one of the active webpage or an item being displayed on the active webpage; receive, via the communications module and from the computing device, a signal indicating selection of the at least one selectable option to apply the loyalty points; and after receiving the signal indicating selection of the at least one selectable option, debit a loyalty points account by a first amount based on the determined conversion rate and crediting a value account by a second amount that is based on the first amount.

In one or more embodiments, determining the conversion rate of loyalty points based on at least one of the active webpage or the item being displayed on the active webpage includes obtaining the conversion rate from a predetermined list that includes at least one of a list of merchants, items or uniform resource locators (URLs) and corresponding conversion rates.

In one or more embodiments, the at least one selectable option includes one or more selectable options to adjust an amount of loyalty points to be used.

In one or more embodiments, the active webpage is an e-commerce website and the processor-executable instructions, when executed by the processor, further configure the processor to in response to determining that the active webpage meets the predetermined criteria, the signal causes the computing device to display the indicator during a shopping experience on the e-commerce website and prior to a checkout page being displayed as the active webpage.

In one or more embodiments, the predetermined criteria includes at least one of determining that a particular item is displayed on the active webpage; determining that the active webpage is a checkout page; and determining that the active webpage is associated with a partner merchant.

In one or more embodiments, the processor-executable instructions, when executed by the processor, further configure the processor to prior to sending the signal causing the computing device to display the indicator, determine an amount of loyalty points in a loyalty points account and available to a user of the computing device; and send, via the communications module and to the computing device, a signal causing the computing device to display the amount of loyalty points available to the user.

In one or more embodiments, the indicator is a selectable visual indicator displayed on the active webpage and the processor-executable instructions, when executed by the processor, further configure the processor to receive, via the communications module and from the computing device, a signal indicating selection of the selectable visual indicator; and after receiving the signal indicating selection of the selectable visual indicator, send, via the communications module and to the computing device, a signal causing the computing device to display an amount of loyalty points to be applied to offset the purchase price.

According to another aspect there is provided a computer implemented method comprising monitoring an active webpage associated with a web browser executing on a computing device; determining that the active webpage associated with the web browser meets predetermined criteria, the predetermined criteria including determining that the active webpage is found in a whitelist; and in response to determining that the active webpage meets the predetermined criteria, sending, via a communications module, a signal causing the computing device to display an indicator indicating an option to apply loyalty points to offset a purchase price.

In one or more embodiments, the whitelist includes at least one of a list of merchants, a list of items or a list of uniform resource locators (URLs).

In one or more embodiments, the indicator includes at least one selectable option to apply the loyalty points to offset the purchase price.

In one or more embodiments, the method further comprises determining a conversion rate of loyalty points based on at least one of the active webpage or an item being displayed on the active webpage; receiving, via the communications module and from the computing device, a signal indicating selection of the at least one selectable option to apply the loyalty points; and after receiving the signal indicating selection of the at least one selectable option, debiting a loyalty points account by a first amount based on the determined conversion rate and crediting a value account by a second amount that is based on the first amount.

In one or more embodiments, determining the conversion rate of loyalty points based on at least one of the active webpage or the item being displayed on the active webpage includes obtaining the conversion rate from a predetermined list that includes at least one of webpages and items and corresponding conversion rates.

In one or more embodiments, the at least one selectable option includes one or more selectable options to adjust an amount of loyalty points to be used.

In one or more embodiments, the active webpage is an e-commerce website and the method further comprises in response to determining that the active webpage meets the predetermined criteria, the signal causes the computing device to display the indicator during a shopping experience on the e-commerce website and prior to a checkout page being displayed as the active webpage.

In one or more embodiments, the predetermined criteria includes at least one of determining that a particular item is displayed on the active webpage; determining that the active webpage is a checkout page; and determining that the active webpage is associated with a partner merchant.

In one or more embodiments, the method further comprises prior to sending the signal causing the computing device to display the indicator, determine an amount of loyalty points in a loyalty points account and available to a user of the computing device; and send, via the communications module and to the computing device, a signal causing the computing device to display the amount of loyalty points available to the user.

According to another aspect there is provided a non-transitory computer readable storage medium comprising computer-executable instructions which, when executed, configure a processor to monitor an active webpage associated with a web browser executing on a computing device; determine that the active webpage associated with the web browser meets predetermined criteria, the predetermined criteria including determining that the active webpage is found in a whitelist; and in response to determining that the active webpage meets the predetermined criteria, send, via a communications module and to the computing device, a signal causing the computing device to display an indicator indicating an option to apply loyalty points to offset a purchase price.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server 120 coupled to one another through a network 130, which may include a public network such as the Internet and/or a private network. The computing device 110 and the server 120 may be in geographically disparate locations. Put differently, the computing device 110 and the server 120 may be located remote from one another.

The server 120 may be associated with a financial institution, a value card provider such as for example a credit card provider, and/or a loyalty points provider.

The server 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The computing device 110 may be a laptop computer as shown in FIG. 1. However, the computing device 110 may be a computing device of another type such as for example a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The server 120 may be associated with or may communicate with a database 140 that stores account data. For example, the account data may be user or customer accounts and may include value account data and loyalty point data. The value account data may include one or more value accounts such as for example a bank account or a credit card account associated with the user. The loyalty point data may include a loyalty points balance available to the user. The loyalty point data may be related to the value account data. For example, the loyalty point data may be based on or related to transactions made by the user on a particular credit card. The account data may additionally include any one or more of a personal name, geographic address, a telephone number, a date of birth, etc. The server 120 may communicate with the database 140 directly or through the network 130. It will be appreciated that although the database 140 is shown as being associated with the server 120, in another embodiment the database 140 may be separate from the server 120 and may be associated with, for example, a third-party server. Further, the server 120 may be associated with multiple databases.

The database 140 may store a "whitelist" identifying merchants, items, and/or uniform resource locators (URLs) for which loyalty points can be redeemed. The merchants, items or URLs for which loyalty points can be redeemed may be associated with one or more third parties. For example, the whitelist may include a partner merchant defined by an agreement made between the financial institution, value card provider or loyalty points provided and the partner merchant.

The database 140 may store a "blacklist" identifying merchants, items, and/or uniform resource locators (URLs) for which loyalty points cannot be redeemed. The merchants, items or URLs for which loyalty points cannot be redeemed may be associated with one or more third parties. For example, the blacklist may include an item offered by a partner merchant, where the item is on back-order or is only available in limited quantities.

The database 140 may store a list that includes a list of merchants, items and/or URLs and an associated conversion rate for each particular merchant, item and/or URL. The conversion rate may be a conversion rate of loyalty points to dollars and may be particular to each of the listed merchants, items and/or URLs. For example, the list may include a partner merchant and a conversion rate of 100:1 for the partner merchant. The conversion rate of 100:1 indicates that every one hundred (100) loyalty points may be redeemed as one (1) dollar.

It will be appreciated that in embodiments, rather than the database 140 storing different lists for the whitelist, blacklist and conversion rate, the conversion rate may be included in the whitelist and/or blacklist. Further, it will be appreciated that multiple databases may be used. Further, the server 120 may communicate with one or more third party servers associated with, for example, different merchants to obtain a whitelist, blacklist and/or conversion rate.

Figure 2:
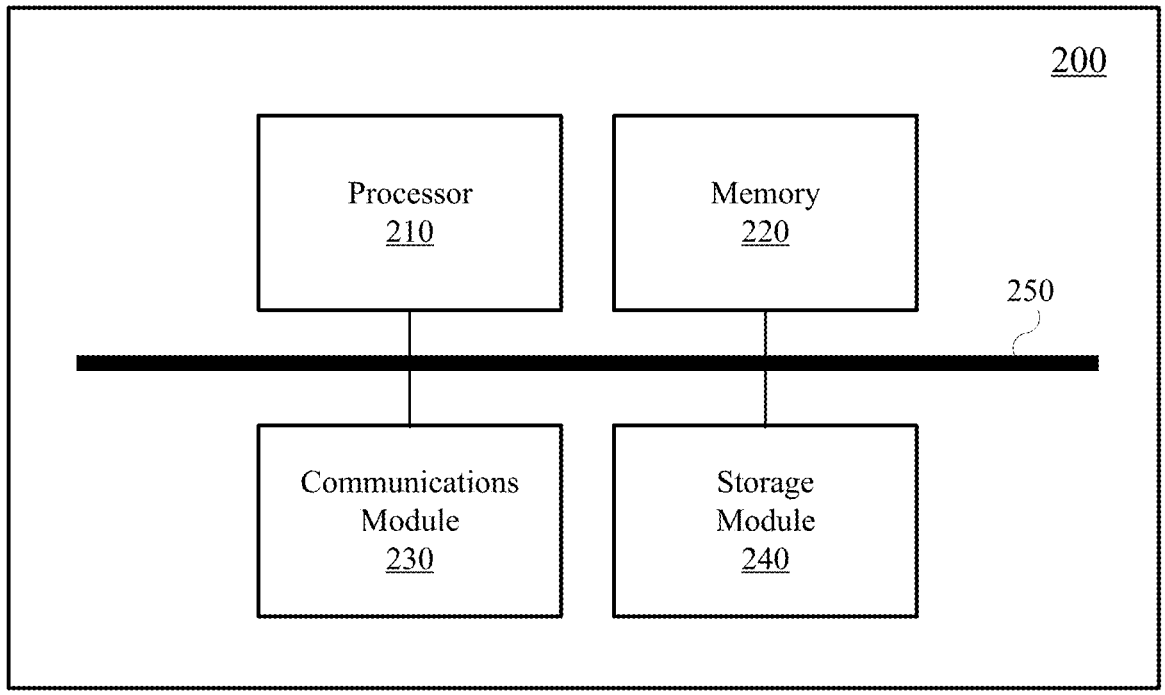
FIG. 2 is a high-level schematic diagram of an example computing device.

FIG. 2 is a high-level schematic diagram of a computer system 200. The computer system 200 may be any one of the computing device 110 and/or the server 120.

The computer system 200 includes a variety of modules. For example, as illustrated, the computer system 200 may include a processor 210, a memory 220, a communications module 230, and/or a storage module 240. Further, while not illustrated in FIG. 2, the computer system 200 may include an I/O module. As illustrated, the foregoing example modules of the computer system 200 are in communication over a bus 250. As such, the bus 250 may be considered to couple the various modules of the computer system 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer system 200.

The communications module 230 allows the computer system 200 to communicate with other computing devices and/or various communications networks such as, for example, the network 130. For example, the communications module 230 may allow the computer system 200 to send or receive communications signals. Communications signals may be sent or received according to one or more protocols or according to one or more standards. The communications module 230 may allow the computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the computer system 200 to communicate using near-field communication (NFC), via Wi-Fi™, using Bluetooth™ or via some combination of one or more networks or protocols. In some embodiments, all or a portion of the communications module 230 may be integrated into a component of the computer system 200. For example, the communications module 230 may be integrated into a communications chipset.

The I/O module is an input/output module. The I/O module allows the computer system 200 to receive input from and/or to provide input to components of the computer system 200 such as, for example, various input modules and output modules. For example, the I/O module may, as shown, allow the computer system 200 to receive input from and/or provide output to a display.

The storage module 240 allows data to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in/from a database, such as the database 140 of FIG. 1 when the computer system is operating as the server 120 of FIG. 1. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
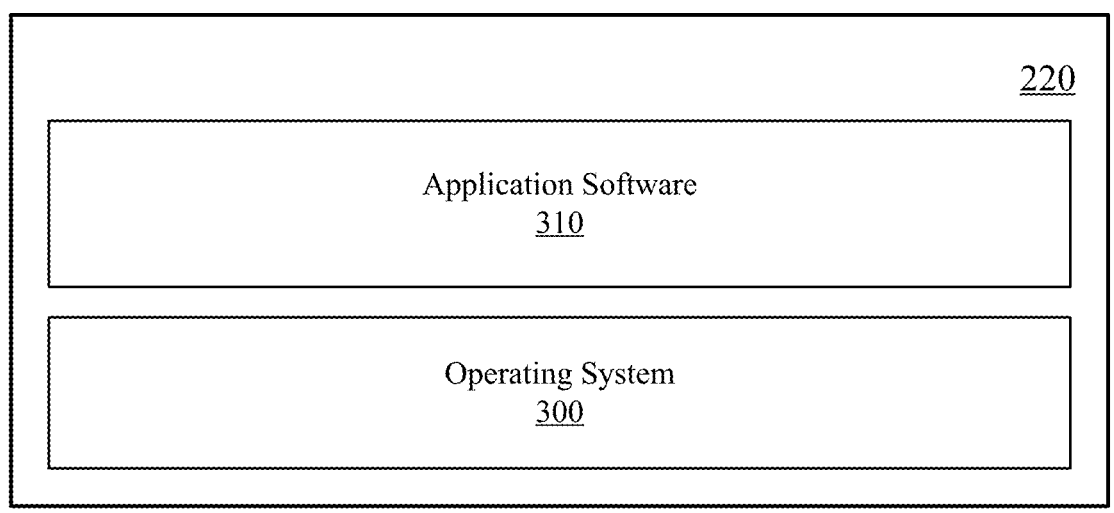
FIG. 3 shows a simplified organization of software components stored in a memory of the example computing device of FIG. 2.

FIG. 3 depicts a simplified organization of software components stored in the memory 220 of the computer system 200. As illustrated, these software components include an operating system 300 and an application software 310.

The operating system 300 is software. The operating system 300 allows the application software 310 to access the processor 210 (FIG. 2), the memory 220, the communications module 230, the I/O module, and the storage module 240 of the client computer system 200. The operating system 300 may be, for example, Google™ Android™, Apple™ iOS™, UNIX™, Linux™, Microsoft™ Windows™, Apple OSX™ or the like.

The application software 310 adapts the computer system 200, in combination with the operating system 300, to operate as a device for performing a specific function. For example, in at least some embodiments in which the computer system 200 functions as the computing device 110, the applications 410 may include a web browser, which may also be referred to as an Internet browser. In at least some such embodiments, the server 120 may be a browser extension server that may provide a browser extension application to the computing device 110. The browser extension application may be configured to monitor an active webpage associated with the web browser executing on the computing device 110. In at least some such embodiments, the server 120 may be a browser plug-in server that may provide a browser plug-in application to the computing device 110. The browser plug-in application may be configured to monitor an active webpage associated with the web browser executing on the computing device.

During an on-line shopping experience, the server 120 provides a user of the computing device 110 an option to offset a purchase price using loyalty points held in one or more accounts of the user. Specifically, through use of the browser extension application or browser plug-in application, the server 120 monitors an active webpage associated with a web browser executing on the computing device 110. When the server 120 determines that the active webpage meets predetermined criteria, the server 120 provides to the computing device 110 an indicator indicating an option to apply loyalty points to offset a purchase price.

Figure 4:
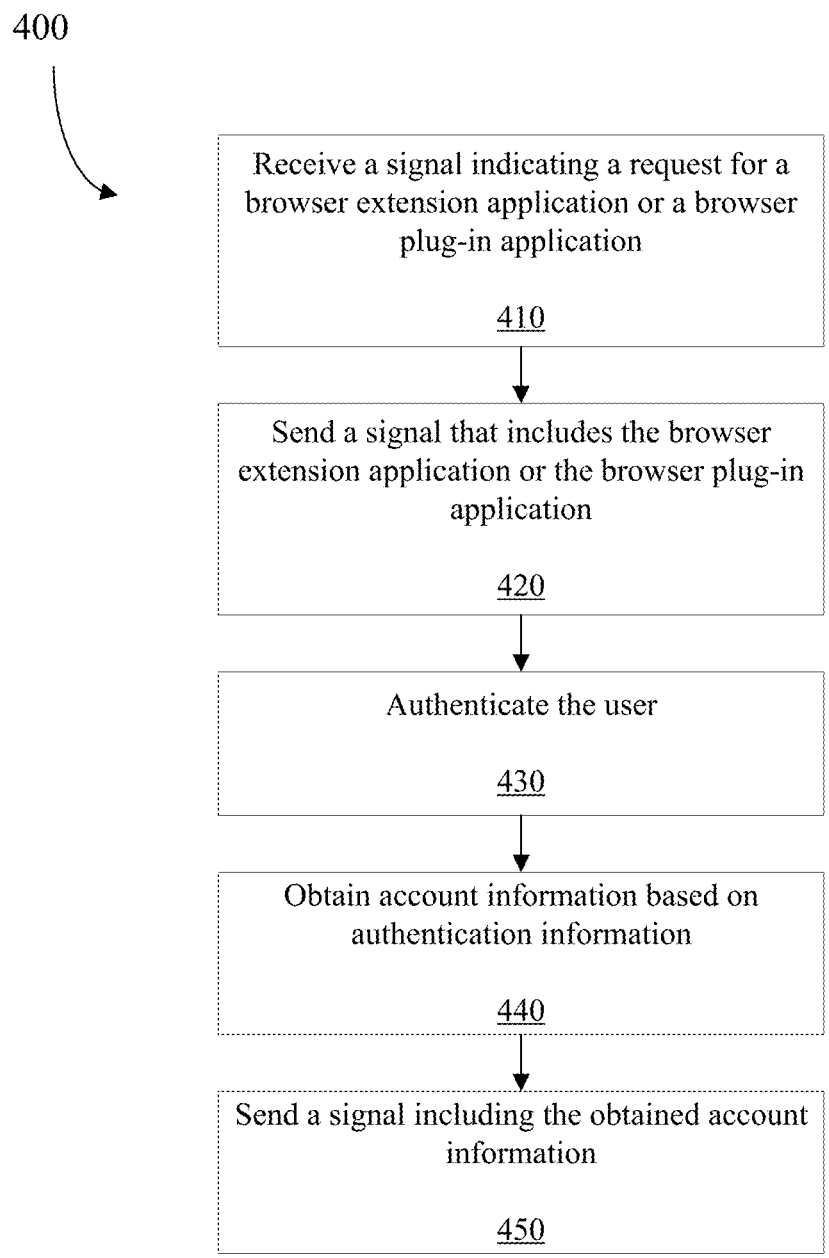
FIG. 4 is a flowchart showing operations performed by a server in providing a browser extension application or a browser plug-in application according to an embodiment.

The server 120 provides the browser extension application or browser plug-in application to the computing device 110. FIG. 4 is a flowchart showing operations performed by the server 120 in providing the browser extension application or browser plug-in application to the computing device 110 according to an embodiment. The operations may be included in a method 400 which may be performed by the server 120. For example, computer-executable instructions stored in memory of the server 120 may, when executed by one or more processors, configure the server 120 to perform the method 400 or a portion thereof.

The method beings when the server 120 receives, via the communications module and from the computing device 110, a signal indicating a request for the browser extension application or browser plug-in application (step 410). In this embodiment, the browser extension application or browser plug-in application may be selected by a user as an add-on through a web browser executing on the computing device 110. The web browser may be for example Google Chrome, Apple Safari, Mozilla Firefox, Microsoft Edge, Microsoft Explorer, etc.

For example, the user may open the web browser and may select a selectable option to download the browser extension application or browser plug-in application. The selectable option may be provided in a list of selectable options, each of which maybe associated with a recommended browser extension application or browser plug-in application. In response to the user selecting the selectable option, the computing device 110 may send a signal to the server 120 indicating a request for the browser extension application or browser plug-in application.

The server 120 sends, via the communications module and to the computing device 110, a signal that includes the browser extension application or browser plug-in application (step 420). The computing device 110 stores the browser extension application or browser plug-in application in memory. The browser extension application or browser plug-in application may remain in memory of the computing device 110 until it is uninstalled or removed by the user. The browser extension application or browser plug-in application is configured to monitor active web pages associated with the web browser executing on the computing device 110. In this manner, the browser extension application or browser plug-in application allow the computing device 110 to communicate with the server 120.

As mentioned, the server 120 is associated with a database 140 that stores account data. In this embodiment, the browser extension application or browser plug-in application requires the user to authenticate to permit the browser extension application or browser plug-in application to access their account data stored on the database 140. As such, once received by the computing device 110, the signal further causes the browser extension application or browser plug-in application to display an interface requesting the user to authenticate by, for example, entering a username and password. It will be appreciated that other authentication methods may be used and may require the user to provide, for example, biometric data such as for example a fingerprint via an input device associated with the computing device 110.

The server 120 authenticates the user (step 430). Specifically, in this embodiment the server 120 receives, via the communication module and from the computing device 110, a signal that includes authentication information. The server 120 compares the received authentication information to previously obtained authentication information stored in the database 140 and when it is determined that the received authentication information matches the authentication information stored in the database, the user is authenticated. For example, the server 120 may compare the received username and password to a previously obtained username and password to authenticate the user.

When the user has been authenticated, the server 120 obtains account information based on the authentication information (step 440). In this embodiment, the server 120 obtains loyalty point data for the user by performing a lookup in the database 140 using the username received during authentication. It will be appreciated that the account information may also include a personal name, geographic address, a telephone number, a date of birth, etc.

The server 120 sends, via the communications module and to the computing device 110, a signal including the obtained account information (step 450). As mentioned, the account information includes loyalty point data for the user. In some embodiment, the user may view the loyalty point data through an interface associated with the browser extension application or browser plug-in application.

Figure 5:
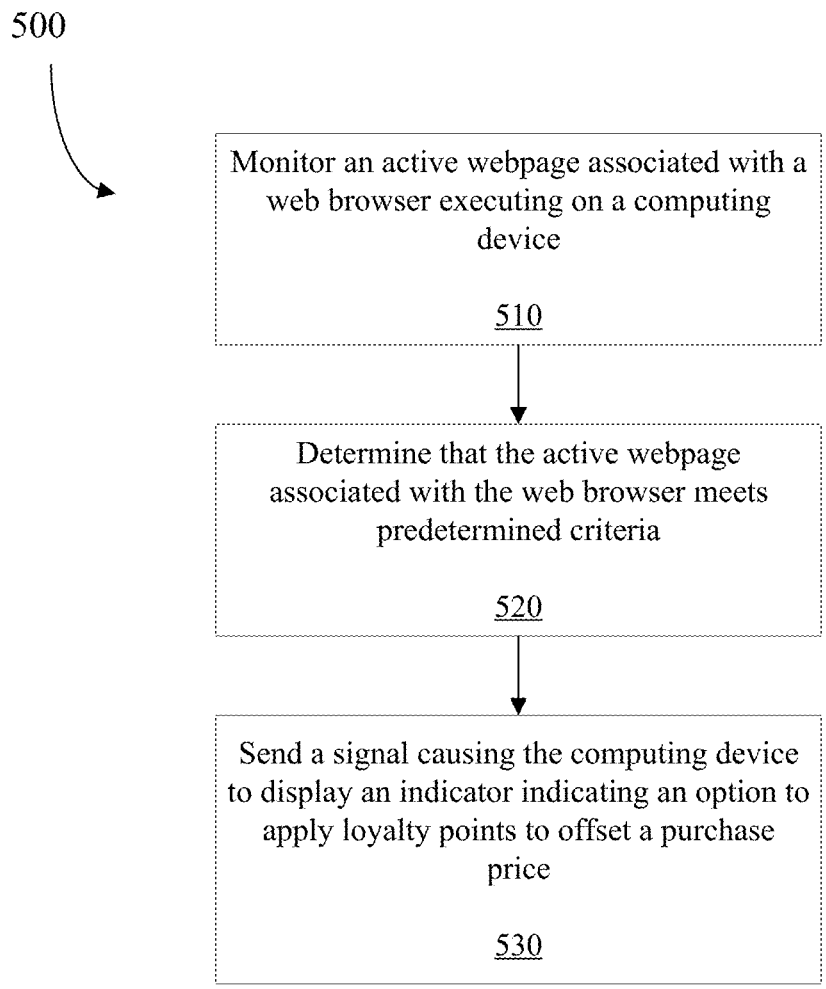
FIG. 5 is a flowchart showing operations performed by a server in providing an indicator to offset a purchase price according to an embodiment.

As mentioned, through use of the browser extension application or browser plug-in application, the server 120 monitors an active webpage associated with a web browser executing on the computing device 110 to provide an indicator to offset a purchase price. FIG. 5 is a flowchart showing operations performed by the server 120 in providing an indicator to offset a purchase price to the computing device 110 according to an embodiment. The operations may be included in a method 500 which may be performed by the server 120. For example, computer-executable instructions stored in memory of the server 120 may, when executed by one or more processors, configure the server 120 to perform the method 500 or a portion thereof.

The server 120 monitors an active webpage associated with a web browser executing on a computing device (step 510). In this embodiment, the server 120 monitors the active webpage associated with the web browser executing on the computing device 110 through use of the browser extension application or browser plug-in application provided during method 400 described herein. The server 120 may monitor the active webpage based on at least part of a Uniform Resource Locator (URL) associated with the active webpage or based on a page source of the active webpage. The page source may include, for example, the Hypertext Markup Language (HTML) programming code of the active webpage.

The server 120 determines that the active webpage associated with the web browser meets predetermined criteria (step 520). In this embodiment, the predetermined criteria includes determining that the active webpage is found in a whitelist, determining that a particular item is displayed on the active webpage, determining that the active webpage is a checkout page, and/or determining that the active webpage is associated with a particular merchant.

For example, the server 120 may compare at least a portion of the URL of the active webpage to a whitelist that includes URLs for which loyalty points can be redeemed. When it is determined that the at least a portion of the URL is found in the whitelist, the server 120 determines that the active webpage meets predetermined criteria. In this example, the portion of the URL may identify that the active webpage is associated with a partner merchant or that the active webpage is an e-commerce website.

As another example, the server 120 may analyze the page source of the active webpage to identify one or more items contained therein. The server 120 may compare the one or more items to a whitelist that includes items for which loyalty points can be redeemed. When it is determined that one or more of the items are found in the whitelist, the server 120 determines that the active webpage meets predetermined criteria.

The server sends, via the communications module and to the computing device, a signal causing the computing device to display an indicator indicating an option to apply loyalty points to offset a purchase price (step 530). The indicator may be for example a visual indicator and/or an audible indicator. The indicator may include one or more selectable options including a selectable option to adjust an amount of loyalty points to be applied to offset the purchase price and/or a selectable option to apply the loyalty points to offset the purchase price.

As mentioned, the server 120 may compare at least a portion of the URL of the active webpage to a whitelist that includes URLs for which loyalty points can be redeemed. The portion of the URL may identify that the active webpage is associated with a partner merchant or that the active webpage is an e-commerce website. In this embodiment, the indicator may be sent to the computing device 110 during a shopping experience on the e-commerce website and prior to a checkout page being displayed as the active webpage. In this manner, the user may, for example, see the visual indicator indicating that the option to apply loyalty points to offset a purchase price for the current webpage is available and this may be done prior to the user visiting a checkout page. Put another way, the server 120 provides an indication to the user that their loyalty points can be used for the shopping experience and this may encourage the user to purchase items as loyalty points can be used to offset the purchase price.

Figure 6:
FIG. 6 is an example toolbar of a web browser executing on a computing device according to an embodiment.

Examples of visual indicators will now be provided. Once the browser extension application or browser plug-in application is installed, an icon indicating that the browser extension application or browser plug-in application is installed may be displayed on a toolbar of the web browser executing on the computing device 110. An example is shown in FIG. 6. As can be seen, an icon 600 is displayed on a toolbar 610 of the web browser executing on the computing device 110. The address bar 620 is also shown.

Figure 7:
FIG. 7 is an example toolbar of a web browser executing on a computing device according to an embodiment.

When it is determined that the active web page associated with the web browser meets predetermined criteria (during step 520 described herein), the server 120 sends the signal causing the computing device to display the indicator indicating an option to apply loyalty points to offset a purchase price. For example, as shown in FIG. 7, the indicator 700 is displayed as a highlighted or illuminated icon. Put another way, the icon 600 shown in FIG. 6 is highlighted as indicator 700 to indicate the option to apply loyalty point to offset the purchase price. It will be appreciated that the signal may also cause the computing device 110 to output an audible alert indicating the option to apply loyalty points to offset the purchase price and this may be done at the same time the icon is being highlighted. Other options are available to manipulate the icon 600 to indicate the option to apply loyalty points to offset the purchase price. For example, the color of the icon may be changed. As another example, the icon may include animations or graphics such that the icon may rotate, bounce, spin, sparkle or otherwise catch the attention of the user.

Figure 8:
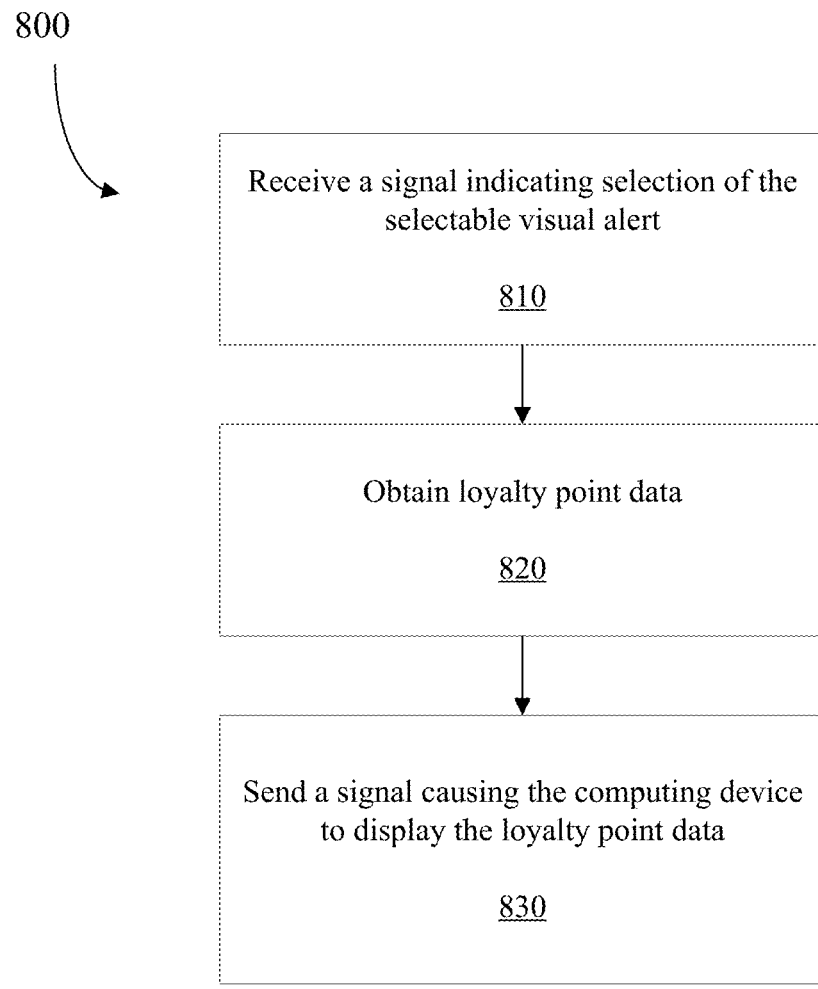
FIG. 8 is a flowchart showing operations performed by a server in providing more information to a user according to an embodiment.

The indicator 700 may be selectable by the user. For example, the user may use an input device such as a mouse of the computing device 110 to select the indicator 700 to view more information regarding applying loyalty points to offset the purchase price. In response to the user selecting the indicator 700, the server 120 may perform operations to provide more information to the user. The operations may be included in a method 800 shown in FIG. 8 which may be performed by the server 120. For example, computer-executable instructions stored in memory of the server 120 may, when executed by one or more processors, configure the server 120 to perform the method 800 or a portion thereof.

The server 120 receives, via the communications module and from the computing device 110, a signal indicating selection of the indicator or selectable visual alert (step 810).

In response to receiving the signal indicating selection of the selectable visual alert, the server 120 obtains loyalty point data including a loyalty points balance available to the user (step 820). In this embodiment, the server 120 obtains the loyalty point data from the database 140.

The server 120 sends, via the communications module and to the computing device 110, a signal causing the computing device 110 to display the loyalty point data (step 830). In this embodiment, the signal causes the computing device 110 to display an amount of loyalty points to be applied to offset the purchase price.

Figure 9:
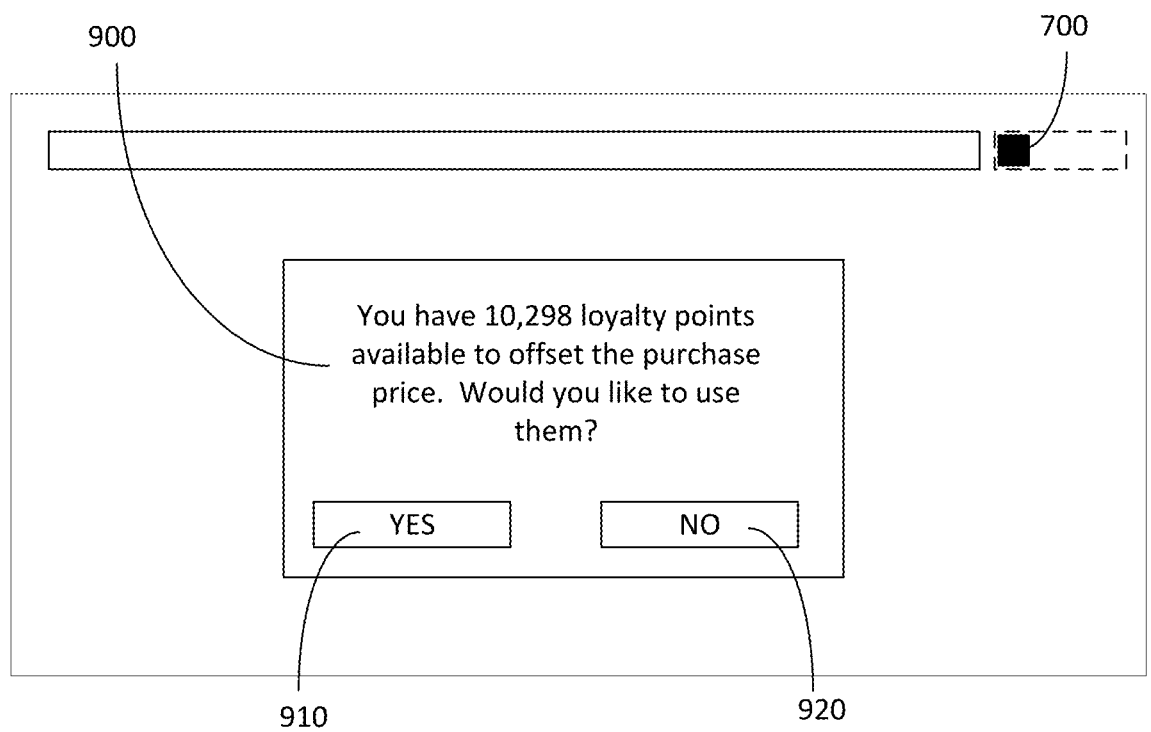
FIG. 9 is an example interface displayed within a web browser executing on a computing device according to an embodiment.

An example is shown in FIG. 9. As can be seen, once the indicator 700 has been selected, the computing device 110 displays the amount of loyalty points to be applied to offset the purchase price in an interface 900. The interface 900 includes a selectable option 910 that, when selected, indicates that the user would like to apply the loyalty points to offset the purchase price and a selectable option 920 that, when selected, indicates that the user would not like to apply the loyalty points to offset the purchase price.

Although the server 120 obtains loyalty point data in response to the user selecting the selectable visual indicator, those skilled in the art will appreciate that the server 120 may obtain loyalty point data and may include this information when providing the indicator. For example, prior to sending the signal causing the computing device 110 to display the indicator, the server 120 may obtain loyalty point data and thus determine an amount of loyalty points in a loyalty points account and available to the user in a manner similar to that described herein with reference to step 820.

Figure 10:
FIG. 10 is an example toolbar of a web browser executing on a computing device according to an embodiment.

The server 120 may include the amount of loyalty points available to the user with the signal causing the computing device to display the indicator and as such the indicator may include or display the amount of loyalty points. An example is shown in FIG. 10. As can be seen, the indicator 1000 includes the amount of loyalty points "10 k" available to the user. The indicator 1000 may be a selectable visual indicator similar to indicator 700 described herein.

Figure 11:
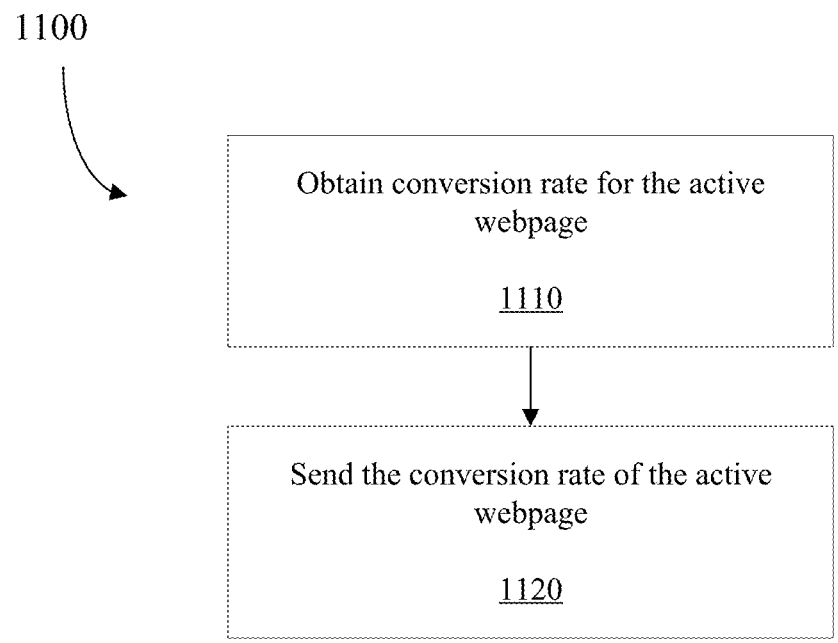
FIG. 11 is a flowchart showing operations performed by a server in obtaining a conversion rate of an active webpage according to an embodiment.

As mentioned herein, the database 140 may store a list that includes a list of merchants, items and/or URLs and an associated conversion rate for each particular merchant, item and/or URL. The server 120 may perform operations to determine the conversion rate for the active web page. FIG. 11 is a flowchart showing operations performed by the server 120 in determining the conversion rate for the active web page according to an embodiment. The operations may be included in a method 1100 which may be performed by the server 120. For example, computer-executable instructions stored in memory of the server 120 may, when executed by one or more processors, configure the server 120 to perform the method 1100 or a portion thereof.

Using the database 140, the server 120 obtains the conversion rate for the active webpage (step 1110). In this embodiment, the server 120 performs a lookup of the active webpage based on at least one of the merchant, item and/or URL of the active webpage and obtains the conversion rate.

The server 120 sends, via the communications module and the computing device 110, a signal including the conversion rate of the active webpage (step 1120). The conversion rate may be displayed within an interface displayed on the computing device 110.

Figure 12:
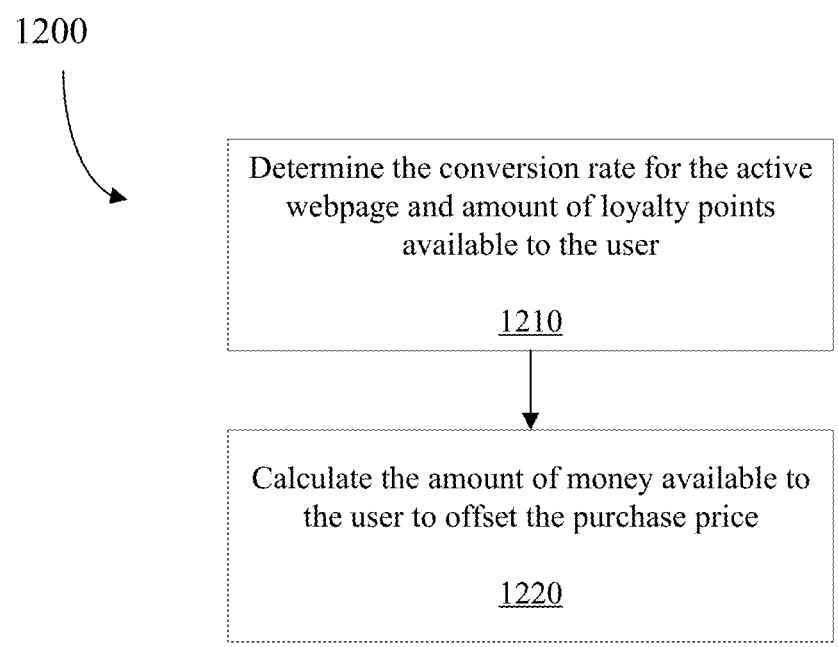
FIG. 12 is a flowchart showing operations performed by a server in calculating an amount of money available to offset the purchase price according to an embodiment.

The server 120 may additionally perform operations to calculate an amount of money available to the user to offset the purchase price based on the obtained conversion rate and the amount of loyalty points available to the user. FIG. 12 is a flowchart showing operations performed by the server 120 in calculating the amount of money available to the user to offset the purchase price based on the obtained conversion rate and the amount of loyalty points available to the user according to an embodiment. The operations may be included in a method 1200 which may be performed by the server 120. For example, computer-executable instructions stored in memory of the server 120 may, when executed by one or more processors, configure the server 120 to perform the method 1200 or a portion thereof.

The server 120 determines the conversion rate for the active webpage and the amount of loyalty points available to the user (step 1210). The conversion rate may be determined in a manner similar to that of step 1110 described herein. The amount of loyalty points available to the user may be determined in a manner similar to that of step 820 described herein.

The server 120 calculates the amount of money available to the user to offset the purchase price based on the determined conversion rate and the amount of loyalty points available to the user (step 1220). For example, the conversion rate may be 100:1 indicating that every one hundred (100) loyalty points may be redeemed as one (1) dollar. The user may have 10,298 available to be redeemed. As such, the amount of money available to the user to offset the purchase price may be calculated as 10,298/100=$102.98.

Figure 13:
FIG. 13 is an example toolbar of a web browser executing on a computing device according to an embodiment.

The server 120 may include the amount of money available to the user to offset the purchase price with the signal causing the computing device to display the indicator and the indicator may include the amount of money available to the user to offset the purchase price. An example is shown in FIG. 13. As can be seen, the indicator 1300 includes the amount of money "$103" available to the user to offset the purchase price. The indicator 1300 may be a selectable visual indicator similar to indicator 700 described herein. It will be appreciated that the indicator 1300 may be updated each time the user visits a different webpage. For example, when the active webpage changes to a webpage associated with a different merchant that has a different conversion rate, the amount of money available to the user to offset the purchase price for the different merchant may be calculated in a manner similar to that described herein with reference to step 1220 and the indicator 1300 may be updated accordingly.

Figure 14:
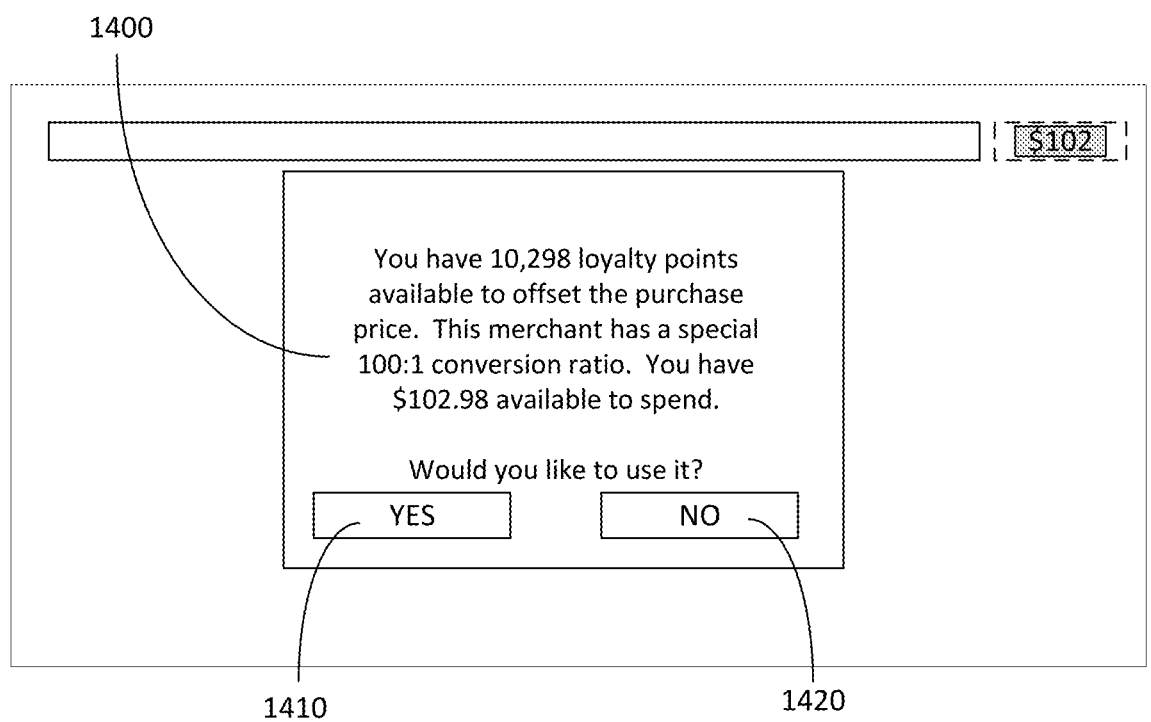
FIG. 14 is an example interface displayed within a web browser executing on a computing device according to an embodiment.

The server 120 may additionally or alternatively include the conversion rate in response to the user selecting the selectable visual indicator. An example is shown in FIG. 14. As can be seen, in response to the selectable visual indicator being selected, the computing device 110 displays the amount of loyalty points to be applied to offset the purchase price, the conversion rate and the amount of money available to the user to offset the purchase price in an interface 1400. The interface 1400 includes a selectable option 1410 that, when selected, indicates that the user would like to apply the loyalty points to offset the purchase price and a selectable option 1420 that, when selected, indicates that the user would not like to apply the loyalty points to offset the purchase price.

Figure 15:
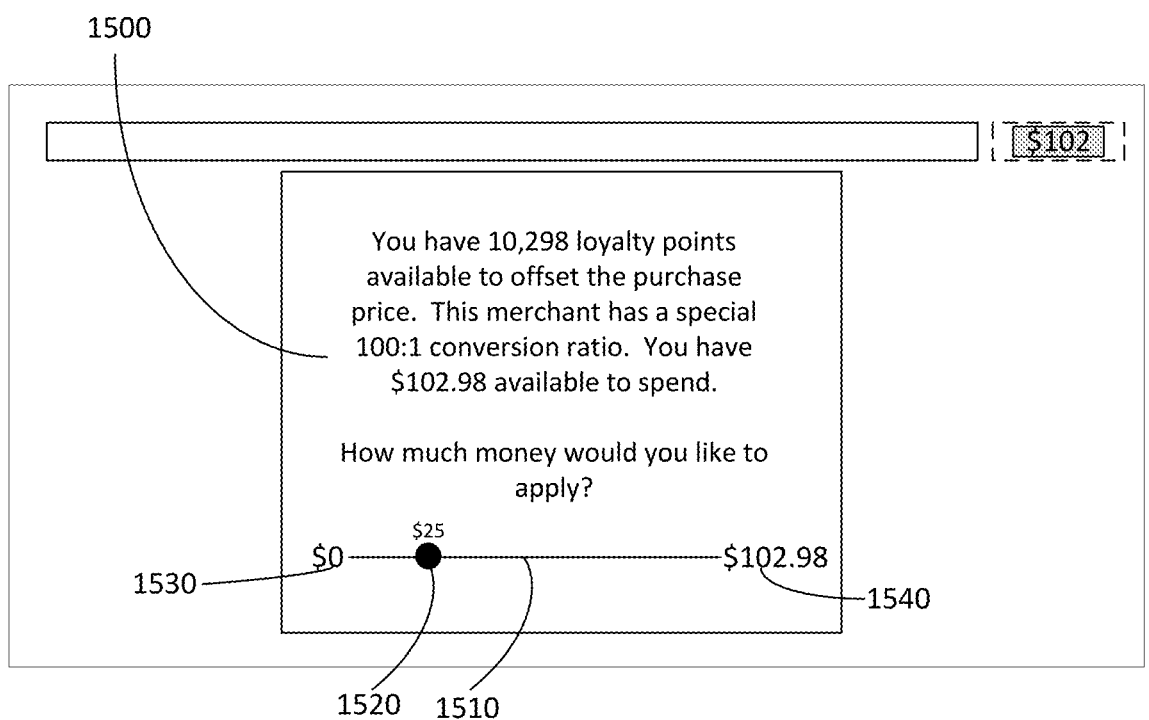
FIG. 15 is an example interface displayed within a web browser executing on a computing device according to an embodiment.

In some embodiments described herein, the indicator provided to the user indicating an option to apply loyalty points to offset a purchase price is a selectable visual indicator. When selected, the indicator causes the computing device to display an interface that includes a selectable option that, when selected, indicates that the user would like to apply the loyalty points to offset the purchase price and a selectable option that, when selected, indicates that the user would not like to apply the loyalty points to offset the purchase price. In another example, the interface may additionally include a selectable option to adjust the amount of loyalty points to be used. An example is shown in FIG. 15. As can be seen, an interface 1500 includes a selectable option in the form of a slider bar 1510. The slider bar 1510 includes an adjustable slider 1520 and indicates a minimum value 1530 ($0) and a maximum value 1540 (based on the amount of money available to the user to offset the purchase price as determined during step 1220 described herein). The amount of money selected by the user is indicated above the slider 1520. The user may adjust the slider 1520 using an input device such as a mouse associated with the computing device 110. As the slider 1520 is adjusted, the amount of money to be applied to the purchase price is adjusted. For example, moving the slider 1520 towards the minimum value 1530 reduces the amount of money to be applied to the purchase price and moving the slider 1520 towards the maximum value 1540 increases the amount of money to be applied to the purchase price. The selectable option may additionally or alternatively include an input field configured to receive text input from a keyboard associated with the computing device 110. For example, the user may enter the amount of money to be applied to the purchase price using the keyboard. It will be appreciated that rather than showing the amount of money to be applied to the purchase price, the interface 1500 may display the amount of points to be applied to the purchase price.

Figure 16:
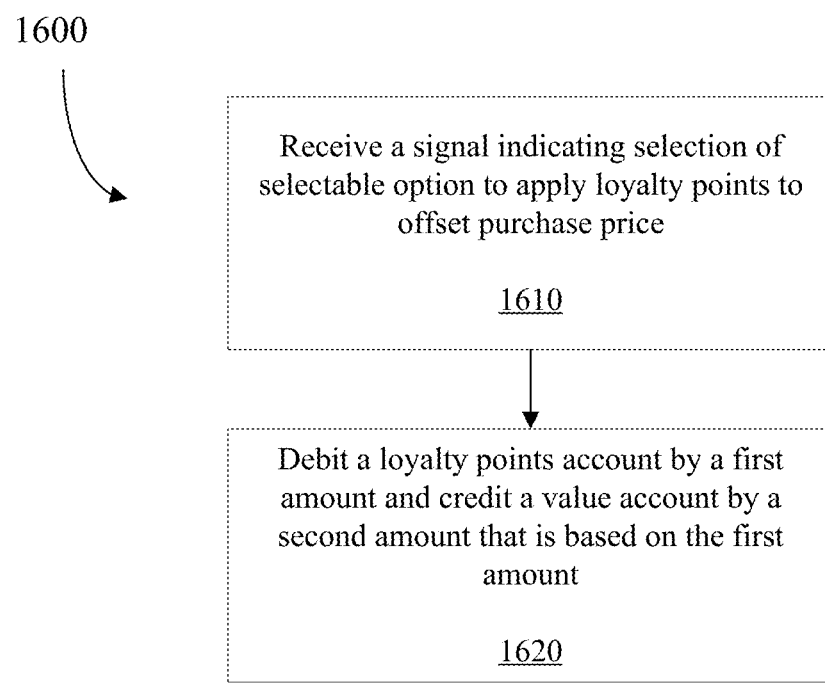
FIG. 16 is a flowchart showing operations performed by a server in applying loyalty points to offset a purchase price according to an embodiment.

In at least some embodiments described herein, the indicator is described as being selectable and, when selected, an interface may be displayed that includes a selectable option to apply the loyalty points to offset the purchase price. In response, the server 120 may perform operations to apply the loyalty points to offset the purchase price. FIG. 16 is a flowchart showing operations performed by the server 120 in applying the loyalty points to offset the purchase price.

The operations may be included in a method 1600 which may be performed by the server 120. For example, computer-executable instructions stored in memory of the server 120 may, when executed by one or more processors, configure the server 120 to perform the method 1600 or a portion thereof.

The server 120 receives, via the communications module and from the computing device 110, a signal indicating selection of the at least one selectable option to apply the loyalty points (step 1610). The signal may include an amount of loyalty points to be applied based on, for example, the user selecting the amount of loyalty points to be applied. Alternatively, the signal may include a dollar amount to be applied and the server 120 may determined, based on the dollar amount and the conversion rate, the amount of points to be applied. The amount of loyalty points to be applied may be referred to as a first amount.

The signal may be received prior to the user checking out of the webpage. Put another way, the user may choose to apply the loyalty points to offset the purchase price prior to the checkout page being displayed as the current webpage. The server 120 may store this information and may apply the loyalty points to offset the purchase price automatically and after the user has completed checkout.

After receiving the signal indicating selection of the at least one selectable option, the server 120 debits a loyalty points account by a first amount based on the determined conversion rate and credits a value account by a second amount that is based on the first amount (step 1620). The loyalty points account is debited based on the amount of loyalty points to be applied to offset the purchase price. The server 120 may calculate a dollar amount to be applied based on for example the amount of loyalty points to be applied and the conversion rate in a manner similar to that described herein. The value account is credited the second amount.

As an example, the value account may be a credit card amount. As such, the credit card may be charged the full amount of the purchase and a credit may be applied to the value account based on the calculated dollar amount. In this manner, the server 120 is able to apply the loyalty points to offset the purchase price prior to the user checking out of the website.

In at least some embodiments described herein, the amount of loyalty points to be applied to offset a purchase price may be selected via a selectable option prior to the user checking out. When the user has selected the selectable option, the amount of loyalty points to be applied to offset the purchase price may be indicated in the indicator, similar to that shown in FIG. 10. In this embodiment, when the user has selected the selectable option, the indicator may be displayed in a different colour indicating that the user has indeed selected the selectable option to apply loyalty points to offset the purchase price. In another embodiment, when the user has selected the selectable option, the dollar amount to be applied to offset the purchase price may be indicated in the indicator, similar to that shown in FIG. 13. In this embodiment, when the user has selected the selectable option, the indicator may be displayed in a different colour indicating that the user has indeed selected the selectable option to apply loyalty points to offset the purchase price.

Figure 17A:
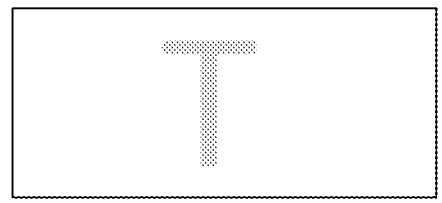
FIGS. 17A, 17B and 17C are example indicators.
Figure 17B:
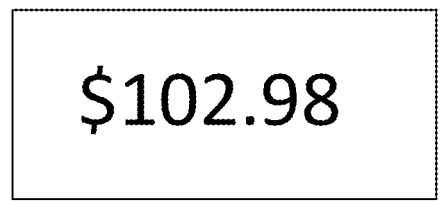
Figure 17C:

In at least some embodiments described herein, the indicator may be displayed in one of a number of different states or colours. An example is shown in FIGS. 17A to 17C. As shown in FIG. 17A, the indicator may be greyed out indicating that the current webpage does not meet predefined criteria and thus is not eligible for loyalty points to be applied to the purchase price. In FIG. 17B, the indicator may be illuminated or highlighted in a first colour indicating that the current webpage meets the predefined criteria and is eligible for loyalty points to be applied to the purchase price. The indicator may also display the dollar amount available to offset the purchase price and this is determined using a conversion rate in manners described herein. In FIG. 17C, the indicator is illuminated in a second colour indicating that the user has selected the selectable option to apply loyalty points to offset the purchase price. The indicator may also display the dollar amount to be applied as selected by the user.

Figure 18:
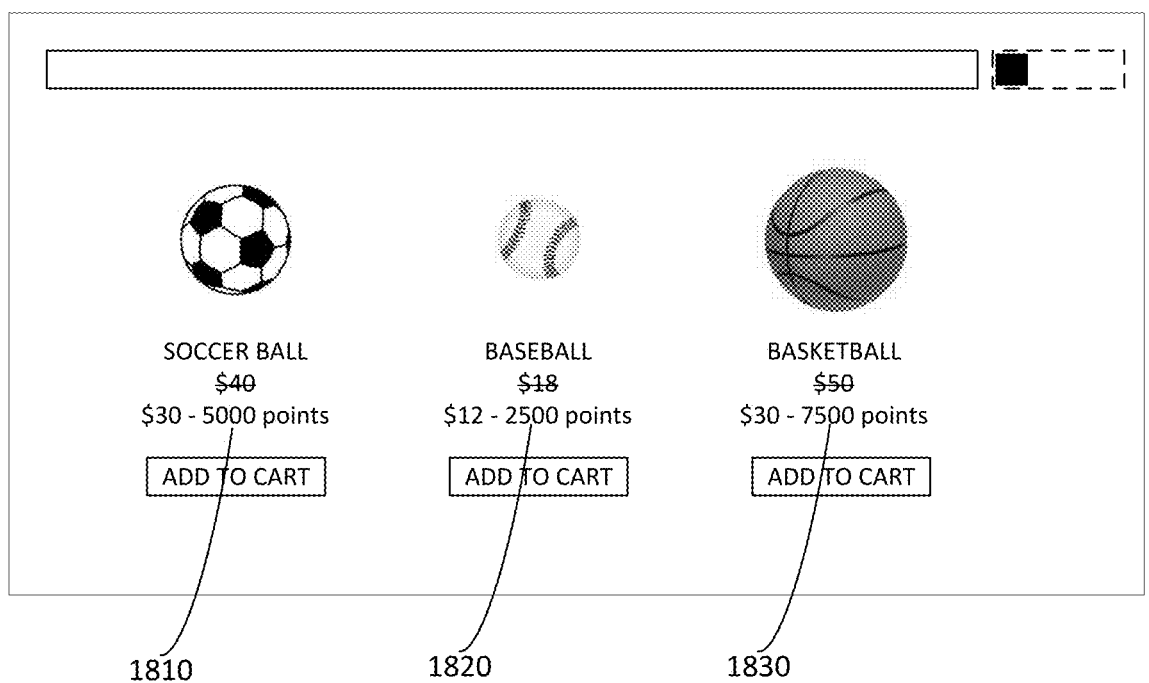
FIG. 18 is an example interface displayed within a web browser executing on a computing device according to an embodiment.

In another embodiment, one or more indicators may be displayed adjacent to one or more items displayed on the active webpage. In this embodiment, the indicator may indicate the amount of points required to offset the purchase price and may also indicate a modified purchase price. Put another way, the indicator may include the amount of points required to offset the purchase price, the modified purchase price, and a strikethrough that is to be overlaid on the list price of the item on the active webpage. The indicator is configured to be overlaid on the active webpage such that it is displayed adjacent to a particular item. An example is shown in FIG. 18. As can be seen, indicator 1810 is displayed indicating that 5000 points may be used to offset the purchase price of $40 to $30. Indicator 1820 is displayed indicating that 2500 points may be used to offset the purchase price of $18 to $12. Indicator 1830 is displayed indicating that 7500 points may be used to offset the purchase price of $50 to $30. To purchase one or more of the items, the user may click on "Add to Cart". Upon checkout, the value account may be credited with the amount shown. For example, if the user purchases the soccer ball and offsets the purchase price of $40 to $30, the value account may be credited with $10. It will be appreciated that the indicators 1810, 1820, 1830 may be generated in a manner similar to that described herein. In another embodiment, only some of the items may be eligible for loyalty point redemption. For example, in the example shown in FIG. 18, only one of the items may be eligible for loyalty point redemption and as such only one of the indicators 1810, 1820, 1830 may be displayed.

Figure 19:
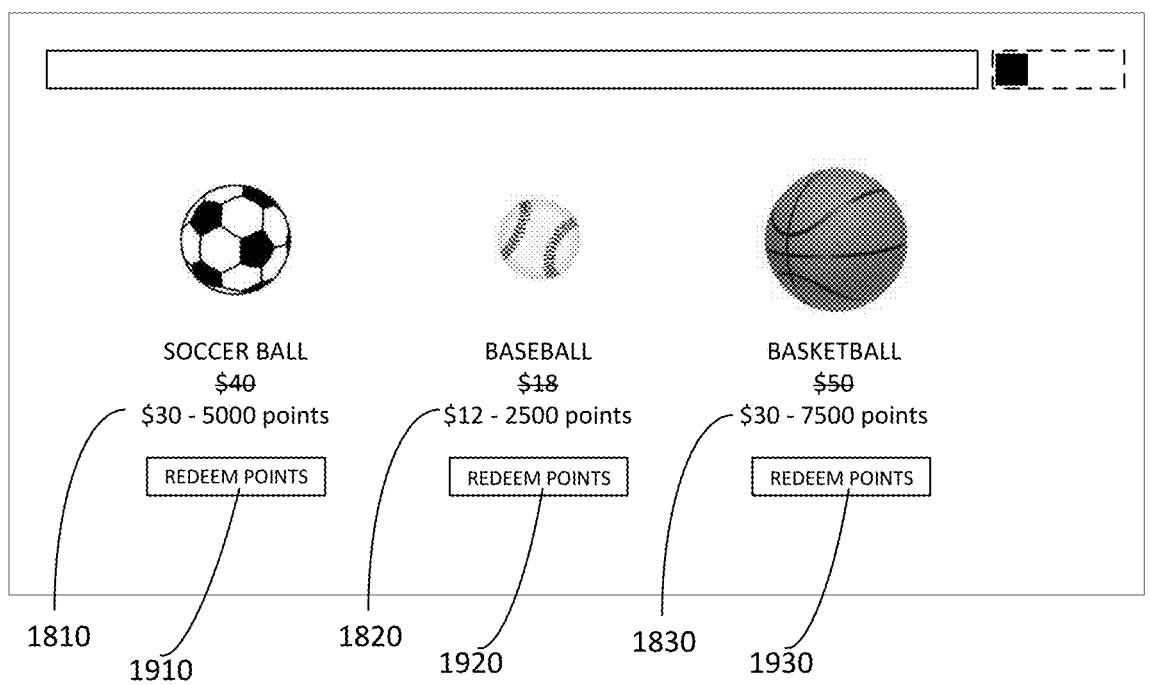
FIG. 19 is an example interface displayed within a web browser executing on a computing device according to an embodiment.

The indicators 1810, 1820, 1830 shown in FIG. 18 may include selectable options to apply loyalty points to offset the purchase price. An example is shown in FIG. 19. As can be see, selectable options 1910, 1920 and 1930 replace the "Add to Cart" button (shown in FIG. 18). The user may select one or more of the selectable options 1910, 1920, 1930 to apply loyalty points to offset the purchase price. When selected, the selectable options 1910, 1920, 1930 may add the corresponding item (soccer ball, baseball, basketball, respectively) to the cart and may apply the loyalty points displayed by the corresponding indicator to offset the purchase price.

Figure 20:
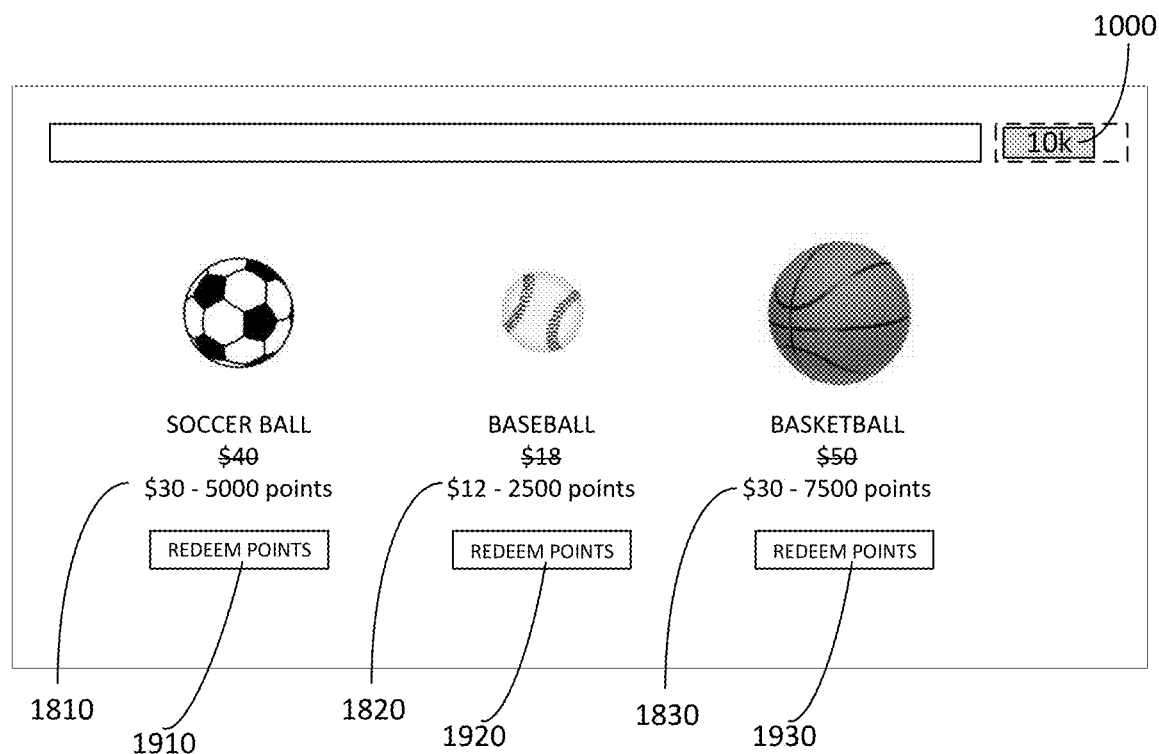
FIG. 20 is an example interface displayed within a web browser executing on a computing device according to an embodiment.

It will be appreciated that combinations of the embodiments described herein may be used. For example, the indicators 1810, 1820, 1830 (FIG. 18) and the selectable options 1910, 1920, 1930 (FIG. 19) may be combined with indicator 1000 (FIG. 10) or indicator 1300 (FIG. 13). An example is shown in FIG. 20 where indicators 1810, 1820, 1830 and the selectable options 1910, 1920, 1930 are displayed. Indicator 1000 is also displayed and indicates the amount of loyalty points available to the user. In a similar example, indicator 1000 may be exchanged for indicator 1300 and as such indicator 1300 is displayed and indicates the amount of money available to the user to offset the purchase price.

The methods described above may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A server comprising:
a communications module;
a processor coupled with the communications module; and
a memory coupled to the processor and storing processor-executable instructions which, when executed by the processor, configure the processor to:
provide one of a browser extension application or a browser plug-in application to a computing device, the browser extension application or the browser plug-in application allowing the server to communicate with the computing device to:
display an indicator indicating that the browser extension application or the browser plug-in application is installed on the computing device;
monitor an active page associated with an application executing on the computing device;
determine that the active page meets predetermined criteria at least by comparing at least a portion of a uniform resource locator of the active page to a whitelist that includes uniform resource locators for which loyalty points can be redeemed; and
responsive to determining that the active page meets predetermined criteria, update the indicator to indicate an option to apply loyalty points from a loyalty point account of a user of the computing device to offset a purchase price and enable selection of the indicator to cause the server to obtain up-to-date loyalty point data and to send a signal causing the computing device to display the obtained loyalty point data during a shopping experience on an e-commerce website or mobile application and prior to a checkout page being displayed as the active page.

2. The server of claim 1, wherein the interface includes at least one selectable option to apply the loyalty points to offset the purchase price.

3. The server of claim 2, wherein the processor-executable instructions, when executed by the processor, further configure the processor to:
determine a conversion rate of loyalty points based on at least one of the active page or an item being displayed on the active page;

receive, via the communications module and from the computing device, a signal indicating selection of the at least one selectable option to apply the loyalty points; and after receiving the signal indicating selection of the at least one selectable option, debit at least one loyalty point account by a first amount based on the determined conversion rate and crediting a value account by a second amount that is based on the first amount.

4. The server of claim 3, wherein determining the conversion rate of loyalty points based on at least one of the active page or the item being displayed on the active page includes obtaining the conversion rate from a predetermined list that includes at least one of a list of merchants, items or uniform resource locators (URLs) and corresponding conversion rates.

5. The server of claim 2, wherein the at least one selectable option includes one or more selectable options to adjust an amount of loyalty points to be used.

6. The server of claim 1, wherein the predetermined criteria further includes at least one of:
   determining that a particular item is displayed on the active page; and
   determining that the active page is associated with a partner merchant.

7. The server of claim 1, wherein the processor-executable instructions, when executed by the processor, further configure the processor to:
   determine an amount of loyalty points in at least one loyalty point account; and
   display the indicator to include the amount of loyalty points in the at least one loyalty point account.

8. The server of claim 1, wherein the processor-executable instructions, when executed by the processor, further configure the processor to:
   determine an amount of loyalty points in at least one loyalty point account;
   determine a conversion rate of loyalty points to dollars based on the active page;
   convert the amount of loyalty points in the at least one loyalty point account to a dollar amount based on the conversion rate; and
   display the indicator to include the dollar amount.

9. A computer-implemented method comprising:
   providing one of a browser extension application or a browser plug-in application to a computing device, the browser extension application or the browser plug-in application allowing a server to communicate with the computing device to perform:
      displaying an indicator indicating that the browser extension application or the browser plug-in application is installed on the computing device;
      monitoring an active page associated with an application executing on the computing device;
      determining that the active page meets predetermined criteria at least by comparing at least a portion of a uniform resource locator of the active page to a whitelist that includes uniform resource locators for which loyalty points can be redeemed; and
      responsive to determining that the active page meets predetermined criteria, updating the indicator to indicate an option to apply loyalty points from a loyalty point account of a user of the computing device to offset a purchase price and enable selection of the indicator to cause the server to obtain up-to-date loyalty point data and to send a signal causing the computing device to display the obtained loyalty point data during a shopping experience on an e-commerce website or mobile application and prior to a checkout page being displayed as the active page.

10. The computer-implemented method of claim 9, wherein the interface includes at least one selectable option to apply the loyalty points to offset the purchase price.

11. The computer-implemented method of claim 10, further comprising:
    determining a conversion rate of loyalty points based on at least one of the active page or an item being displayed on the active page;
    receiving, via the communications module and from the computing device, a signal indicating selection of the at least one selectable option to apply the loyalty points; and
    after receiving the signal indicating selection of the at least one selectable option, debiting at least one loyalty point account by a first amount based on the determined conversion rate and crediting a value account by a second amount that is based on the first amount.

12. The computer-implemented method of claim 11, wherein determining the conversion rate of loyalty points based on at least one of the active page or the item being displayed on the active page includes obtaining the conversion rate from a predetermined list that includes at least one of a list of merchants, items or uniform resource locators (URLs) and corresponding conversion rates.

13. The computer-implemented method of claim 10, wherein the at least one selectable option includes one or more selectable options to adjust an amount of loyalty points to be used.

14. The computer-implemented method of claim 9, wherein the predetermined criteria further includes at least one of:
    determining that a particular item is displayed on the active page; and
    determining that the active page is associated with a partner merchant.

15. The computer-implemented method of claim 9, further comprising:
    determining an amount of loyalty points in at least one loyalty point account; and
    displaying the indicator to include the amount of loyalty points in the at least one loyalty point account.

16. The computer-implemented method of claim 9, further comprising:
    determining an amount of loyalty points in at least one loyalty point account;
    determining a conversion rate of loyalty points to dollars based on the active page;
    converting the amount of loyalty points in the at least one loyalty point account to a dollar amount based on the conversion rate; and
    displaying the indicator to include the dollar amount.

17. A non-transitory computer readable storage medium comprising computer-executable instructions which, when executed, configure a processor of a server to:
    provide one of a browser extension application or a browser plug-in application to a computing device, the browser extension application or the browser plug-in application allowing the server to communicate with the computing device to:
       display an indicator indicating that the browser extension application or the browser plug-in application is installed on the computing device;

monitor an active page associated with an application executing on the computing device;

determine that the active page meets predetermined criteria at least by comparing at least a portion of a uniform resource locator of the active page to a whitelist that includes uniform resource locators for which loyalty points can be redeemed; and responsive to determining that the active page meets predetermined criteria, update the indicator to indicate an option to apply loyalty points from a loyalty point account of a user of the computing device to offset a purchase price and enable selection of the indicator to cause the server to obtain up-to-date loyalty point data and to send a signal causing the computing device to display the obtained loyalty point data during a shopping experience on an e-commerce website or mobile application and prior to a checkout page being displayed as the active page.

\* \* \* \* \*